(12) United States Patent
Fu

(10) Patent No.: US 7,109,972 B2
(45) Date of Patent: Sep. 19, 2006

(54) ADJUSTABLE POINTING AND CONTROL DEVICE WITH AUTOMATIC HANDEDNESS SWITCH

(76) Inventor: Liang Fu, 12046 Gatewater Dr., Potomac, MD (US) 20854

( * ) Notice: Subject to any disclaimer, the term of this patent is extended or adjusted under 35 U.S.C. 154(b) by 504 days.

(21) Appl. No.: 10/636,744

(22) Filed: Aug. 8, 2003

(65) Prior Publication Data

US 2005/0030278 A1 Feb. 10, 2005

(51) Int. Cl.
*G09G 5/08* (2006.01)

(52) U.S. Cl. .................................. 345/163; 345/156
(58) Field of Classification Search ............ 345/156, 345/157, 158, 159, 160, 161, 163, 164, 167, 345/169, 173; 463/37
See application file for complete search history.

(56) References Cited

U.S. PATENT DOCUMENTS

| | | | |
|---|---|---|---|
| 5,260,696 A | 11/1993 | Maynard, Jr. | |
| 5,731,807 A | 3/1998 | Feierbach | |
| 5,841,425 A | 11/1998 | Zenz, Sr. | |
| 5,847,696 A | 12/1998 | Itoh et al. | |
| 5,870,081 A | 2/1999 | Wu | |
| 5,894,303 A | 4/1999 | Barr | |
| 6,031,523 A * | 2/2000 | Bunke et al. | 345/163 |
| 6,064,371 A * | 5/2000 | Bunke et al. | 345/163 |
| 6,072,471 A | 6/2000 | Lo | |
| 6,091,403 A | 7/2000 | Bland | |
| 6,124,846 A | 9/2000 | Goldstein et al. | |
| 6,154,196 A | 11/2000 | Fleck et al. | |
| 6,229,527 B1 | 5/2001 | Shearn | |
| 6,300,941 B1 | 10/2001 | Segalle | |
| 6,362,811 B1 | 3/2002 | Edwards et al. | |
| 6,373,468 B1 | 4/2002 | Leman | |
| 6,727,889 B1 * | 4/2004 | Shaw | 345/163 |
| 2002/0118174 A1 * | 8/2002 | Rodgers | 345/163 |
| 2003/0058219 A1 * | 3/2003 | Shaw | 345/161 |

OTHER PUBLICATIONS

U.S. Appl. No. 10/117,672, filed Aug. 29, 2002, Rodgers.

* cited by examiner

*Primary Examiner*—Vijay Shankar
*Assistant Examiner*—Nitin Patel

(57) ABSTRACT

An adjustable pointing and control device with automatic handedness switch. The top of the housing can be adjusted independently in three desirable directions, roll, pitch, and height, with adequate ranges to provide optimal operating positions for all users, including left-handed and right-handed users, at all working positions. Any other undesirable adjustment is prohibited. The housing comprises an adjustable coupling means that provides the adjustability while covers the inside components. The automatic handedness switch keeps suitable control configuration for left-handed users and right-handed users based on the roll orientation of the housing top.

20 Claims, 4 Drawing Sheets

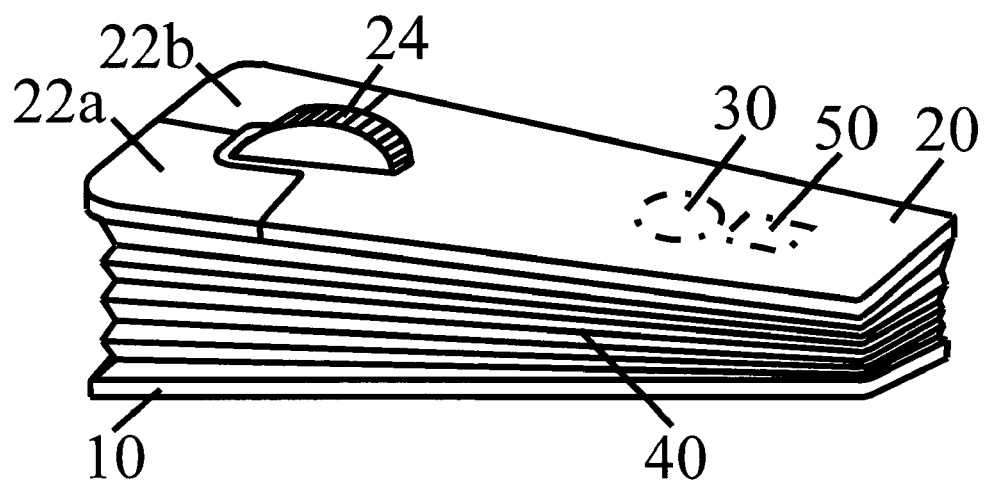
FIG.1-A
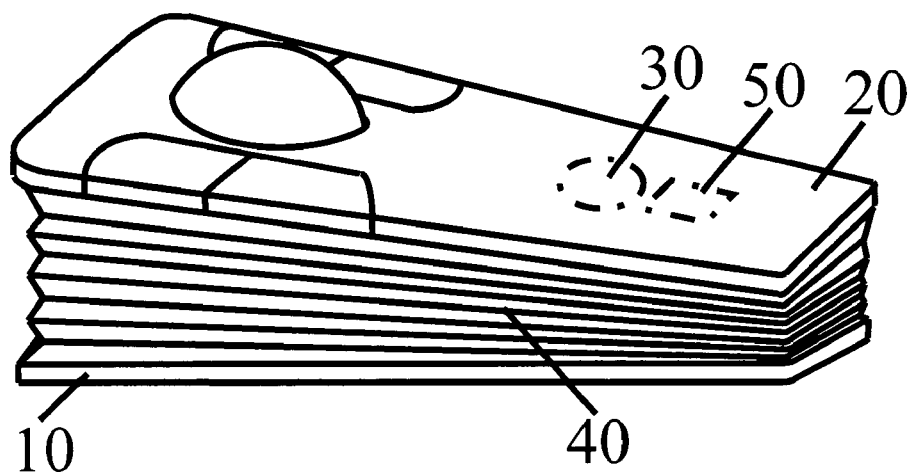
FIG.1-B

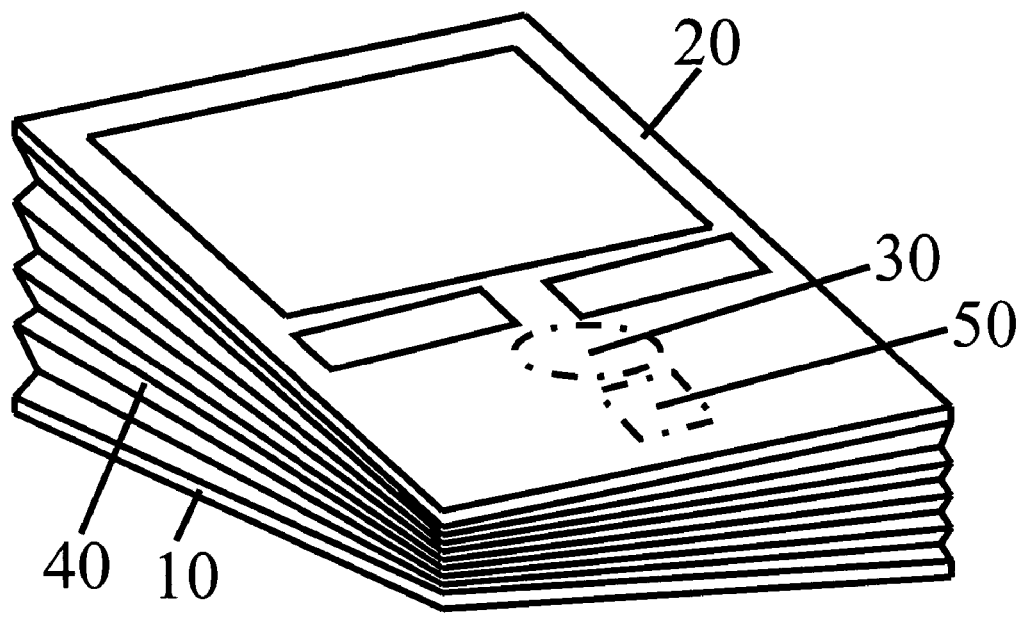
FIG.1-C
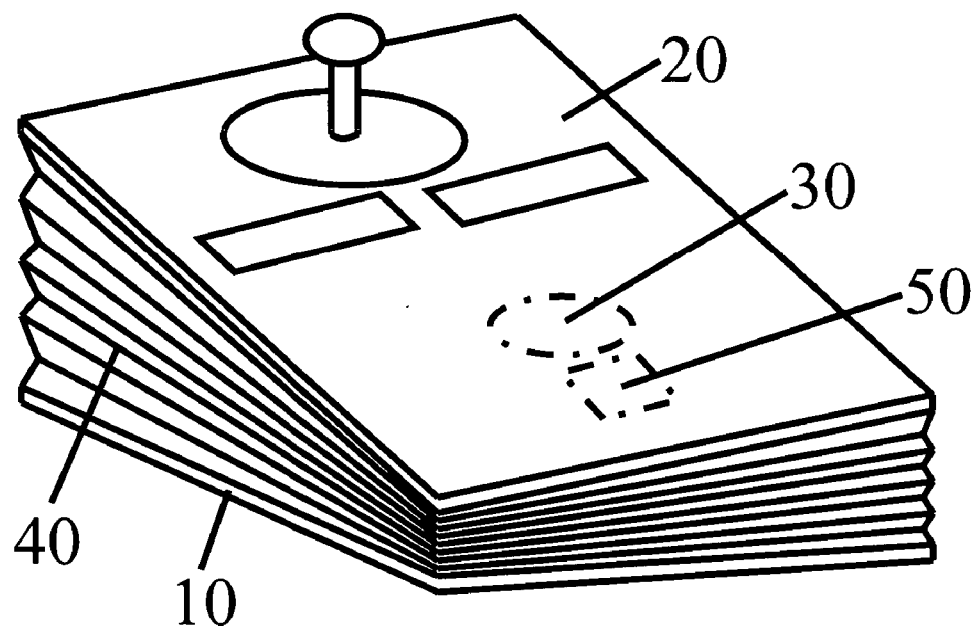
FIG.1-D

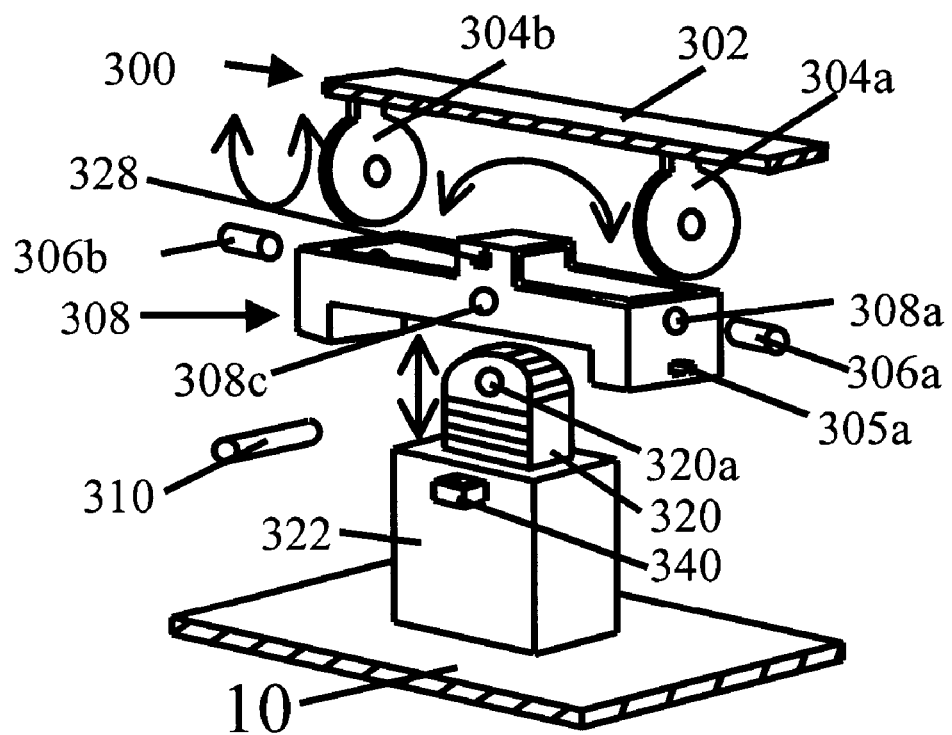
FIG.2-A
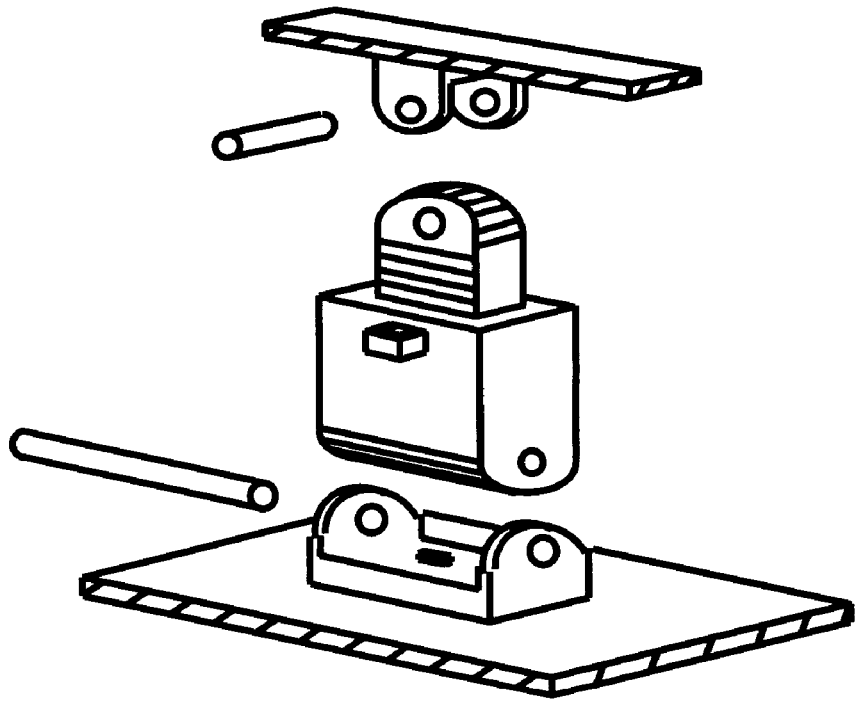
FIG.2-B

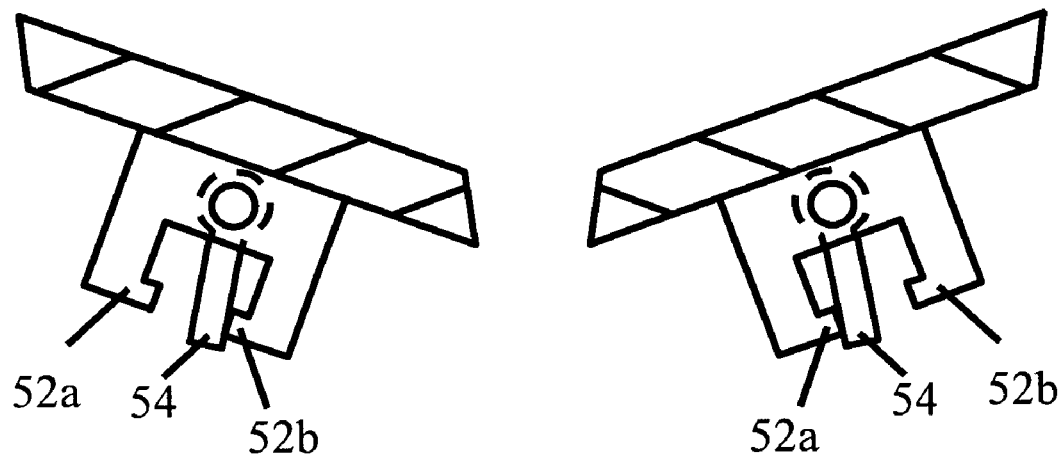
FIG.3-A
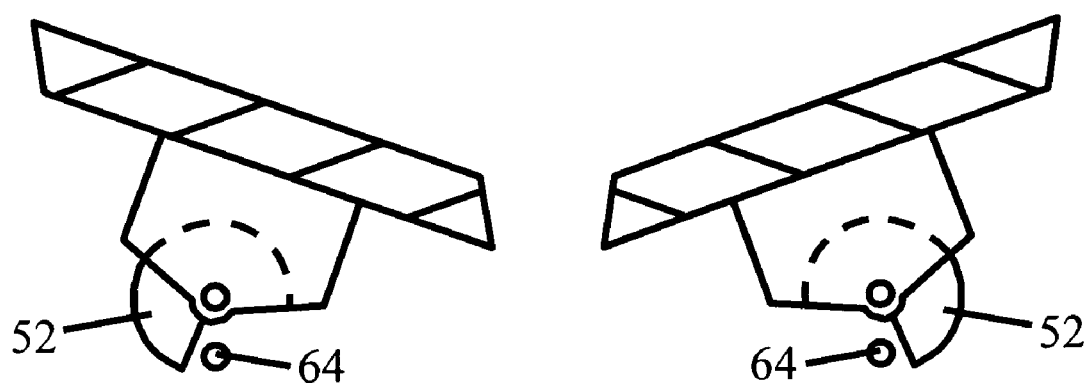
FIG.3-B

ADJUSTABLE POINTING AND CONTROL DEVICE WITH AUTOMATIC HANDEDNESS SWITCH

CROSS-REFERENCE TO RELATED APPLICATIONS

Not Applicable

FEDERALY SPONSORED RESEARCH OR DEVELOPMENT

Not Applicable

SEQUENCE LISTING OR PROGRAM

Not Applicable

BACKGROUND OF THE INVENTION

1. Field of Invention

This invention relates to pointing and control devices, especially to adjustable pointing and control devices.

2. Backgroound of the Invention—Prior Art

Pointing and control device serves as the interface between an operator and the equipment being controlled. The most popular pointing and control device is the computer mouse. A pointing and control device generally consists of a housing, a motion sensor, multiple controls, and an electronic circuitry that includes a microprocessor and a communication links (cable or wireless) to the computer or equipment. The most popular motion sensors include conventional roller-ball motion sensor, optical motion sensor, trackball, touch pad, and joystick. The motion sensor is either underneath (conventional roller ball and optical mouse) or on top (trackball, touch pad, and joystick) of the housing. It is responsible for generating two-dimensional (2-D) motion signals (including direction and amount) that are used by the computer to move the cursor on screen display. The controls are disposed on the exterior of the housing, and they include switch controls and roller-wheel controls. Each switch control is coupled to a micro-switch inside the housing, which is responsible for generating on and off control signals that are used to issue simple commands. Roller-wheel controls generate control signals that usually are used to control image scroll. The electronic circuitry processes the motion signals and control signals, formats them into suitable forms, and communicates them with the computer or equipment via the communication link.

To use a pointing and control device, a user places one (usually the dominant) hand on top of the device, uses fingers to operate the controls, and either slides it on a horizontal surface (a mouse-type) or uses fingers to operate the primary motion sensor (track ball, touch pad, joystick).

As computer window programs and graphical user interface (GUI) become increasingly popular, the use of pointing and control devices becomes more and more extensive and intensive. Intensive and prolonged use of pointing and control devices can cause repetitive stress injury (RSI) and copal tunnel syndrome (CTS) to the user's hand. It is believed that the most significant contributor to RSI and CTS is an incorrect hand posture. Most pointing devices require the palm plane of the users to be substantially horizontal, while the most comfortable (relaxed) palm position is at an angle roughly between 30 to 80 degrees from the horizontal position, depending on the individual and the working position. Awkward hand posture not only causes extra stress to relevant muscle groups but also makes the operation of the controls more difficult and stressful. Prolonged use of pointing and control device with incorrect posture results in fatigue, discomfort, and even permanent injury.

Many attempts have been made to solve this problem. The most popular approach, which represents the majority of the so-called ergonomic designs, is to move away from the symmetric design and make the top of the control device sloped to one side. For example, U.S. Pat. No. 6,091,403 to Bland (2000), U.S. Pat. No. 6,124,846 to Goldstein (2000), and U.S. Pat. No. 5,894,303 to Barr (1999) disclose such designs, where the user's palm plane forms an angle with the horizontal plane of approximately 20, 45, and 90 degrees, respectively. This approach suffers from a number of limitations:

1. It suits either right-handed or left-handed individuals, but not both. A right-hand design is extremely difficult, or even practically inoperable, for left-handed users, and vice versa.
2. It cannot provide the most comfortable operating position to all users even within the targeted handedness, since each person's most comfortable operating position differs from that of others.
3. It cannot provide the most comfortable operating position for the same user at all times, since the most comfortable operating position also depends on the user's working position.

U.S. Pat. No. 6,300,941 to Segalle et al. (2001), U.S. Pat. No. 6,229,527 to Sheam (2001), U.S. Pat. No. 5,731,807 to Feierbach (1998), and U.S. patent application Ser. No. 10/117,672 of Rodgers (2002) suggest using pliable materials for the top that can be molded to fit a user's hand. For such designs, composing the pliable materials with desired properties and designing the other parts (such as switch controls and wheels) in order to accommodate the moldable structure can be very difficult. Furthermore, such designs cannot provide the required mechanical integrity and stability, especially for accurate tasks such as graphics and CAD. In addition, the molded shape may gradually deform under the pressure of user's hand.

U.S. Pat. No. 5,847,696 to Itoh et al. (1998) and U.S. Pat. No. 5,260,696 to Maynard (1993) disclose movable caps on top of a pointing device, but the adjustment is limited to one direction and the switch controls do not move with the cap. U.S. Pat. No. 5,260,696 further has a v-shaped bottom, so that the device can be tilted to the left and right. But there is only one left and one right position, and the tilt angle is very limited, or significant motion encoding error (explained in that patent) may result.

U.S. Pat. No. 5,870,081 to Wu (1999) and U.S. Pat. No. 6,064,371 to Bunke (2000) disclose adjustable computer mouse housings, both based on a pivot mechanism, which allow the user to adjust the upper portion of the mouse. These designs suffer from a number of disadvantages:

1. The allowed adjustments of the upper portion are confined to a spherical surface centered at the pivot point, hence, the allowed adjustments are not independent (both pitch and roll adjustments are provided and thus correlated by the pivot shaft).
2. The allowed ranges of adjustments are limited, since they rely on open gaps between the upper and the lower portion, and an open-through hole (U.S. Pat. No. 5,870,081). Such open gaps and open-through hole are undesirable, since they allow dust and moisture to get into the housing. It is practically impossible for these designs to incorporate relatively large angle adjustments (for example, greater than 45 degrees).
3. The allowed ranges of adjustments also depend on the length of the pivot shaft, which in turn determines the height of the mouse, while a particular height may not fit all users or one user at all working positions.
4. The upper portion shifts horizontally away from the lower portion when tilted. This further limits the ranges of adjustments or the device may become mechanically unstable.
5. The allowed movement also includes the undesirable rotation of the upper portion about the pivot shaft axis, resulting in misalignment with the lower portion. This misalignment in turn causes an incongruent movement of the cursor relative to the movement of the mouse, which is undesirable, especially in delicate work such as graphics and CAD. Although U.S. Pat. No. 5,870,081 uses constraining bars and grooves to restrict such rotation, it cannot be completely eliminated, because, for the upper portion to be adjustable, some play between the constraining bars and grooves is required.
6. The range of the undesirable rotation increases with the ranges of desirable adjustments, since they all depend on the open gaps.
7. Since the adjustments rely on the gaps among the components, such designs require relatively strict dimensions and shapes of the parts, in order for them to fit each other, which increases the difficulty and cost in designing and manufacturing.

U.S. Pat. No. 6,154,196 to Fleck et al. (2000) discloses pointing device with an adjustable outer shell. The adjustment in this design also relies on the open gaps between the parts and a hole on the inner shell, hence having similar limitations and problems as U.S. Pat. Nos. 5,870,081 and 6,064,371. Furthermore, the adjustment is limited to only one direction at three stable positions (left, neutral, and right).

In addition to all the major disadvantages discussed above, the vast majority of the prior-art pointing and control devices having their controls configured for a targeted handedness (mostly the right-handed one), in the hardware. Although for computer pointing and control devices such control configuration can be switched by software, most people find the software switching cumbersome. In fact, many computer users, especially right-handed users, do not even know how to perform the software switching. This problem is significant for families with both left-handed and right-handed members, and public facilities such as computer centers, laboratories, and libraries. It is desirable that, especially for adjustable pointing and control devices that are supposed to accommodate left-handed and right-handed users, the control configuration can be easily shifted from one handedness to the other.

U.S. Pat. No. 6,362,811 to Edwards et al. (2002) discloses a computer mouse with button plate that can be detached, rotated by 180 degrees, and reattached to accommodate both left and right handed users. U.S. Pat. No. 6,373,468 to Leman (2002) discloses a computer mouse where the top cover has two sets of button caps and can be detached, rotated 180 degrees, and reattached. These detachable button plate and cover are inconvenient and hard to figure. U.S. Pat. No. 6,072,471 to Lo (2000) discloses a computer mouse with two sets of buttons, one for left-handed users and the other for right-handed users, with an external switch that allows a user to selectively disable one set of the buttons. A redundant set of buttons is clearly undesirable in many respects. Furthermore, users have to flip the switch to change handedness configuration. U.S. Pat. No. 5,841,425 to Zenz Sr. (1998) discloses a computer mouse with two sensors each for a handedness. This design requires a complex logic circuitry and a user must keep in contact with the sensor corresponding to the user's handedness and avoid touching the other sensor (for the opposite handedness), or otherwise the switch controls may not function. To avoid the inadvertent touch of the wrong sensor by other fingers or parts of hand, such sensors must be placed in secure locations. But then, a user has to make a conscious effort in order to keep in contact with the correct sensor. This requires additional awareness and effort on the part of the user, and it may cause further difficulty in more complex maneuvers, such as dragging an object and blocking (selecting) a portion of a document where a user has to perform three tasks simultaneously: keeping in contact with the correct sensor, holding down the let switch control, and moving the mouse. Furthermore, this system requires devotion of the user's thumb, hence, it may not be convenient to combine with other thumb-operable controls. U.S. Pat. No. 6,154,196 also mentions a sensor system that detects the user's handedness, and the computer (software) changes the switch control configuration accordingly. However, no detail of the sensor system is disclosed in that patent.

Background of the Invention—Objects and Advantages

The present invention solves all of the aforementioned problems of the prior-art pointing and control devices, and offers several additional advantages. The major objectives and advantages of the present invention are:

1. to provide an adjustable pointing and control device that can be adjusted easily, independently, and continuously in all three desirable directions: roll, pitch, and height;
2. to provide an adjustable pointing and control device that allows no other undesirable movements, such as rotation between the upper and the lower portion about a vertical axis, which can cause misalignment between the top and the base;
3. to provide an adjustable pointing and control device that allows large ranges of adjustments to suit practically all users in all working conditions;
4. to provide an adjustable pointing and control device that leaves no open gap between the top and the base, protecting the inside components from moisture and dust;
5. to provide an adjustable pointing and control device that can be used by both left-handed and right-handed users, and can be adjusted easily from one handedness to the other;
6. to provide an adjustable pointing and control device that automatically configures the handedness of the controls by hardware without any conscious effort on the part of the user;
7. to provide an adjustable pointing and control device that requires only minimal, simple, and inexpensive components;
8. to provide an adjustable mechanism that can be adopted for practically all pointing and control devices and couples to their original electronic components with very little or no modification. Further objectives and advantages will become apparent from descriptions and drawings.

SUMMARY

In accordance with the present invention, a pointing and control device comprises an adjustable housing and an automatic handedness switch. The adjustability is provided by an adjustable coupling means, that comprises either a flexible sidewall plus an adjustable coupling assembly, or a semi-rigid sidewall. The adjustable coupling assembly comprises three types of independent adjustable elements, each type providing adjustment in a desirable direction (roll, pitch, or height). The flexible sidewall accommodates the adjustments and protects the inside components from prevents moisture and dust. The semi-rigid sidewall provides by itself the adjustability in roll, pitch, and height, and protects the inside components from moisture and dust. The housing can be adjusted in roll, pitch, and height direction with large ranges of adjustments, providing an optimal operating position to all users (including both left-handed and right-handed) at all working positions. The automatic handedness switch changes configuration of the controls (switching the control signals) automatically when the housing is adjusted from one handedness to the other, without additional action or attention from the user.

DRAWINGS—FIGURES

In the drawings, closely related figures have the same number but different alphabetic suffixes.

FIG. 1-A shows the present invention used in a mouse type pointing and control device.

FIG. 1-B shows the present invention used in a trackball type pointing and control device.

FIG. 1-C shows the present invention used in a touch pad type pointing and control device.

FIG. 1-D shows the present invention used in a joystick type pointing and control device.

FIG. 2-A shows one example of the adjustable coupling assembly of the present invention.

FIG. 2-B shows another example of the adjustable coupling assembly of the present invention.

FIG. 3-A shows one example of hardware structure of the automatic handedness switch of the present invention.

FIG. 3-B shows another example of hardware structure of the automatic handedness switch of the present invention.

DETAILED DESCRIPTION—PREFERRED EMBODIMENT

Preferred Embodiment

The present invention can be applied to virtually all types of pointing and control devices, either existing or conceivably developable. Some exemplary applications of the present invention are illustrated in FIG. 1-A to 1-D.

FIG. 1-A illustrates the use of present invention in a computer mouse. This example will be used as the basis for the detailed description. The adjustable pointing and control device of the present invention comprises a base 10, a top 20, an adjustable coupling assembly 30 (inside the housing, shown as a doted circle), a flexible sidewall 40, and an automatic handedness switch 50 (inside the housing, shown as a doted square). The base 10 is a substantially flat plate that carries a 2-D motion sensor (not shown). On the exterior of top 20 there are three controls: a left switch control 22a, a right switch control 22b, and a roller-wheel control 24. The adjustable pointing and control device of the present invention uses basically the same electronic components of ordinary pointing and control devices, except the circuit board has to be slightly modified. Firstly, the electronic components that directly couple to the controls on the top (microswitches, actuators, etc.) have to be fixed with the top. Secondly, the control signals from those controls that need to be configured for handedness have to go through the automatic handedness switch 50. One choice is to fix the whole circuit board with the top, reroute the control signals of those controls that need to be configured through the automatic handedness switch and back to the circuitry, and connect the motion sensor that is on the base (mouse type) to the circuitry with a flexible cable. Another choice is to divide the circuit board into a primary and a secondary circuit board. The latter is fixed with the top and contains the necessary electronic components that directly couple to the controls on the top, and the former is fixed with the base and contains all remaining electronic components. The control signals from the secondary circuit board are connected to the primary circuit board through flexible cables, with the control signals from those controls that need to be configured being rerouted through the automatic handedness switch.

The adjustable coupling assembly 30 and the flexible sidewall 40 constitute the adjustable coupling means that couples the top 20 to the base 10 and provides the adjustability. Refer to FIG. 2-A for a detailed description of an exemplary structure of the adjustable coupling assembly 30. This adjustable coupling assembly comprises a first, a second, and a third independently adjustable element. The first adjustable element allows rotational adjustment in roll direction about a first axis, parallel to the longitudinal axis of the top 20. The second adjustable element allows rotational adjustment in pitch direction about a second axis, parallel to the lateral axis of the top 20. The third adjustable element allows translational adjustment in the vertical direction. Starting from the top of FIG. 2-A, a first frame 300 consists of a beam 302 and two discs 304a and 304b. The beam 302 is affixed to the undersurface, and along the longitudinal axis of the top 10 (not shown in FIG. 2-A). Two bolts, 306a and 306b, rotatably hinge the two disks 304a and 304b onto a second frame 308 through holes 308a and 308b (at symmetric position of 38a, not shown), respectively. This forms the first adjustable element, witch will be referred as the roll hinge. A bolt 310 rotatably hinges the second frame 308, through holes 308c, and 308d (at symmetric position of 308c, not shown) onto the top of the inner column 320 of the telescope pillar (through hole 320a). This forms the second adjustable element, which will be referred as the pitch hinge. The inner column 320 fits slidably inside the outer sheath 322, although it cannot be pulled out completely. This forms the third adjustable element, which will be referred as the telescope pillar. The base of the telescope pillar is affixed to the upper surface of the base 10 (shown in portion in FIG. 2-A). Each of the three adjustable elements provides an independent adjustment in a distinct direction (roll, pitch, and height). Although in this embodiment some parts of the adjustable elements have been combined physically in order to simplify the structure (frame 308 constitutes part of the roll hinge and part of the pitch hinge, and the inner column 320 of the telescope pillar includes the other part of the pitch hinge), each of the three adjustable elements can exist independently.

Each adjustable element may be equipped with a latching means. Using the roll hinge in FIG. 2-A as an example, a latching means comprises a spring urged latch, 305a, which engages the teeth (not depicted) on the circumference of disc 304a. The latching means can be lockable or non-lockable.

For a non-lockable latching, when a torque greater than a predetermined threshold is exerted about the roll hinge axis, the spring urged latch is forced to retract, allowing the disc to rotate. Here the predetermined threshold torque should be greater than those exerted by user's hand during normal use. A proper threshold torque can be obtained by a proper choice of the shapes of the engaging latch and teeth, and the spring constant. This latching means provides a desirable tactile (and audible) feedback to the user as each tooth passes the latch. In a lockable latching means, the engaging teeth and latch as well as the spring constant are chosen such that when the latch and teeth are fully engaged (locked), the disc is not allowed to rotate. The lockable latching means further comprises an electromagnet (not shown) which, when activated, pulls the latch away from the disc and allows it to rotate. The preferred design is that when unlocked the latch partially engages the teeth of the disc such that the disc is allowed to rotate while the latch still provides the tactile (and audible) feedback. Similarly, the teeth on the top surface and side surface of the inner column 320 of the telescope pillar engage the latch 328 and the latch 340, respectively. With lockable latching means, an unlocking button (switch) controls all three electromagnets. This unlocking button should be placed in a secure position, such as a recess on the exterior of the housing, in order to avoid any accidental unlocking during normal use.

An alternative lockable latching mechanism is to give the roll hinge and the pitch hinge some play, for example, making the holes 308a, 308b (not shown), 308c, and 308d (not shown) into an elongated shape so that the bolt 306a, 306b, and 310 can slide a bit. Normally, these bolts are pushed downwardly by (additional) urging springs and the latches are locked (fully engaged). When a user pulls the top 20 away from the base 10 against the urging springs, the latches are unlocked and the user can adjust the roll and pitch orientation. A separate mechanical or electromagnetic latching means (with an unlocking button) is further provided for telescope pillar.

The adjustable coupling assembly 30 is located on the central symmetric line (longitudinal line), somewhat closer to the rear end, as shown in the FIG. 1-A to 1-D. The exact location of the adjustable coupling assembly is determined in such a way that, during normal use of the device, the mechanical torque from the user's hand about the pitch hinge axis is minimal. In other words, the combined force exerted by the user's hand during the normal use of the device substantially passes through the central axis of the telescope pillar. This reduces the mechanical instability and the chance of any unintentional adjustment in the case of non-lockable latching.

Notice that in FIG. 2-A, the axes of the roll and pitch hinges are intentionally made to cross each other. This makes the pitch and roll adjustments to be at the same point in space, i.e., at the intersecting point of the two hinge axes, which will be referred as the center of rotational adjustments. Nonetheless, the pitch and roll adjustment remain independent. In addition, the configuration shown in FIG. 2-A makes the center of rotational adjustments very close to the top 20. Such configuration ensures that the top 20 undergoes almost no horizontal shift when adjusted, thus providing maximal mechanical stability. In some particular situations, other choices may be preferred, the present structure can easily be modified to fit any such particular requirement. It is clear from FIG. 2-A and the foregoing descriptions that both of the roll and pitch hinges allow large ranges, possibly close to 90 degrees, of rotations in corresponding directions. As shown in FIG. 2-A, the telescope pillar has an essentially rectangular cross-section, which prevents rotation about its axis. Such rotation could result in misalignment of the top 20 and base 10. However, the cross section of the telescope pillar can be of any other shape, as long as it does not allow any relative rotation between the inner pillar and the outer shell.

Refer to FIG. 1-A for a detailed description of an exemplary structure of the flexible sidewall 40. The flexible sidewall 40 is basically a tube made of flexible material, such as rubber, latex, plastic, fabric, etc. Preferably, it consists of a rippled structure, as illustrated in the figures, in order to accommodate large adjustments. The upper and lower ends of the flexible sidewall 40 seal the circumferences of the base 10 and the top 20, respectively, thus preventing dust and moisture from entering the housing. If the material used is relatively rigid, a small air vent may be required. A small balloon may be installed on the air vent inside the housing as an air reservoir, in order to balance the air pressure inside the housing. It is clear that the present invention requires neither that the top and the base to fit with each other, nor that they have some restricted shapes and dimensions.

Refer to FIG. 3-A for detailed description of an example of the automatic handedness switch 50. The neutral position (zero roll adjustment) is a natural border for left-handed and right-handed zones, with the neutral position itself being included in either the left-handed or, preferably, the right-handed zone. It is desirable that control configuration is automatically changed when the top 20 is being adjusted passing the neutral position, so that no user action or attention is required. This is precisely how the automatic handedness switch 50 of the present invention functions. Again, there are many ways to carry out this aspect of the present invention. A few possible structures are given as examples.

Shown in detail in FIG. 3-A is one of the possible structures of the automatic handedness switch for a pointing and control device with two switch controls (left and right). The automatic handedness switch has a casing with two clamp tips 52a and 52b. The casing is fixed on the inner surface of top 20, or on the portion of the adjustable coupling assembly that rotates together with top 20, such as beam 320 in FIG. 2-A. A switching piece 54 is rotatably hinged to the casing of the automatic handedness switch, on an axis parallel to the roll hinge axis. A counter weight (not depicted) at its free end tends to keep switching piece 54 in a vertical position. The switching piece has two separate electrodes extending to both sides (not shown). On each of the clamp tip 52a and 52b, there are four electrodes (not shown), $LB_{in}$, $LB_{out}$, $RB_{in}$, $RB_{out}$. $LB_{in}$ and $RB_{in}$. $LB_{in}$ and $RB_{in}$ carry the left switch control and right switch control signals, respectively. $LB_{out}$ and $RB_{out}$ are connected, respectively, to the original input for the left switch control signals and the original input for the right switch control signals of the circuit board. On the right clamp tip 52b, the four electrodes are arranged in order of $LB_{in}$, $LB_{out}$, $RB_{in}$, $RB_{out}$ while on the left clamp tip 52b, the four electrodes are arranged in order of $LB_{in}$, $RB_{out}$, $RB_{in}$, $LB_{out}$. When top 20 is in the right-handed zone (left panel of FIG. 3-A), the switching piece is in contact with the right clamp tip 52b, and the two electrodes on the switching piece connect $LB_{in}$ to $LB_{out}$ and $RB_{in}$ to $RB_{out}$, respectively, so that no switching occurs. When top 20 is in the left-handed zone (right panel of FIG. 3-A), the switching piece is in contact with the left clamp tip 52a, and the two electrodes on the switching piece connect $LB_{in}$ to $RB_{out}$ and $RB_{in}$ to $LB_{out}$, respectively, so that the functions of the left and right switch controls are effectively switched.

Preferably, the space between the two clamp tips is slightly wider than the thickness of the switching piece, so that at any latched position, one and only one clamp tip is in contact with the switching piece. Preferably, the two clamp tips are slightly asymmetric, with the right clamp tip slightly longer than the left clamp tip, so that the neutral position belongs to the right-handed zone. Other signals that do not need switching, such as signals from the scroll wheel (or a middle switch control), are directly connected to the circuitry. Therefore, the automatic handedness switch always keeps the correct control configuration without any conscious effort on the part of the user.

Operation

The adjustable pointing and control device of the present invention can be adjusted in roll, pitch, and height directions to provide an optimal hand posture. This optimal posture depends on a user's handedness, physiologic characteristics, habit, and working position, and it may change from time to time. To adjust the roll and pitch orientation, the user simply turns the top relative to the base in the desired direction. To adjust the height, the user simply pushes the top towards the base or pulls the top away from base in the vertical direction. With a lockable latching means, the user must unlock the latching means before making any adjustment. With a non-lockable latching, the user simply applies an adjustment force (torque) greater than a predetermined threshold. The controls will be automatically configured, based on the roll orientation of the top.

Alternative Embodiments—Alternative Embodiments

The preferred embodiments disclosed above serve as examples to teach the fundamental idea and spirit of the present invention. There are numerous ways to carry out the fundamental idea and spirit of the present invention. For example, based on the interconnection order of the three independent adjustable elements (roll, pitch, and height), there are six possible permutations. One of them is shown in FIG. 2-A and has been discussed in detail. The second permutation can be achieved by rotating the adjustable coupling assembly shown in FIG. 2-A by 90 degrees about the central axis of the telescope pillar, so that the roll hinge becomes the pitch hinge, and vice versa. This arrangement has basically the same properties as the original shown in FIG. 2-A. FIG. 2-B shows a third permutation, where the roll hinge is attached to the top 20 and the pitch hinge is attached to the base 10, with the telescope pillar connected in between. Compared with the previous embodiment shown in FIG. 2-A, this embodiment follows the same basic idea (using three independently adjustable elements) although the parts have been modified somewhat. The remaining three permutations can be achieved by inverting (upside down) the adjustable coupling assembly of the three previous cases.

In the preferred embodiment shown in FIG. 2-A, the three axes, i.e., the roll axis, the pitch axis, and the telescope pillar axis, are chosen as to cross each other at one point, close to the top 20. The advantage of that arrangement is to insure a minimal horizontal shift of the top 20 resulting from adjustment. In some particular cases, other configurations (such that one, two, or all three axes do not cross one another) may be preferred. Such configurations are readily achievable from the preferred embodiment.

In the preferred embodiment, both the first (roll) and second (pitch) adjustable elements that provide rotational adjustments have a form of hinge, there are many other possibly equivalent forms. For example, two slidably joined pieces, where one piece can slide along an arced groove on the other piece, can provide similar rotational adjustments. In the preferred embodiment, the third adjustable element (height) is a telescope pillar, there are many possible variations for this adjustable element as well. Any structure with two pieces slidably joining each other, in such a manner that each piece can slide relative to the other in one and only one direction, can also be used.

Also in the preferred embodiment, the position of the adjusting coupling assembly is located on the central longitudinal line, and is closer to the rear of the device. This is designed to provide the maximum mechanical stability and to reduce the chance of any advertent adjustment for the non-locked latching (the exact criterion of the location has been given above). In some particular cases, other positions may be desirable.

There are also simplified versions for the adjustable coupling assembly. For example, it may have only one or two of the three adjustable elements and provide adjustability in only one or two directions. There are a total of six such combinations.

Another direction of variation is to use duplicated elements to construct the adjustable coupling assembly. For example, it is possible to use two sets of adjustable elements on the line parallel to the longitudinal axis of the housing, each set consists of a roll hinge and a telescope pillar (or their equivalents). Or, it is possible to use two sets of adjustable elements on a line parallel to the lateral axis, each set consists of a pitch hinge and a telescope pillar (or their equivalents). In these cases the coupling of the adjustable elements to the base and/or to the top needs to be slightly modified to have some play (instead of tightly hinged) to accommodate the adjustments. The resultant devices also have adjustability in height, roll, and pitch, similar to that of the preferred embodiment. In such case the combined structure of all adjustable elements is considered as one adjustable coupling assembly. In summary, the essence of the adjustable coupling assembly of the present invention is that it is constructed with the three types of independent adjustable elements as basic building blocks, in any suitable number, any suitable form, and any suitable interconnection. With three types of independent adjustable elements, the present invention provides much more flexibility than the prior-art designs do.

Furthermore, any other suitable latching mechanisms that are known in the art can be used. Friction may be used as a sole latching mechanism, or it may be combined with other mechanisms.

The handedness switch in the preferred embodiment utilizes gravity to accomplish the automatic control configuration switching. Obviously, any other suitable switch, such as mercury tilt switches or even ordinary electric switches, can be used. FIG. 3-B illustrates one example using an ordinary electric switch. When the top 20 is being adjusted passing the neutral position (left panel of FIG. 3-B), the switch lever 52 hits a pole 64 that is fixed with the adjustable coupling means (for example, extension of the bolt in FIG. 2-A), and the switch switches to the other state (right panel of FIG. 3-B). Although the automatic handedness switch can accommodate any number of controls, an additional electric rely may be used in the case that a large number of controls needs to be configured, or a complex control configuration is required. In such cases, the automatic handedness switch is used only as a trigger for the electric relay. The automatic handedness switch may also be replaced with an external handedness switch. The external handedness switch can be either a mechanical switch or a sensor-activated relay. The present invention does not require redundant controls or a complex logic circuitry as the prior-art designs. The automatic handedness switch can also be omitted (leaving the task of control configuration to the software).

In the preferred embodiment, the flexible sidewall 40 has a rippled structure. This is designed to provide maximum flexibility to accommodate large ranges of adjustments. Of course, non-rippled or other structures can also be used, as long as they provide the sidewall with required flexibility.

Another alternative of the adjustable coupling means is a semi-rigid sidewall that incorporates the functions of both the adjustable coupling assembly and the flexible sidewall. A semi-rigid sidewall is also of a tubular shape with one end joining the circumference of the base and the other end joining the circumference of the top. It is made of a certain material or has a certain structure, such that it is rigid enough to hold the (adjusted) form of the housing during normal use, while it can be deformed when a force greater than a predetermined threshold is applied. Preferably, it has rigidity that prohibits rotation of the top relative to the base. Therefore, the semi-rigid sidewall itself constitutes the adjustable coupling means: it not only functions as a sidewall but also provides adjustability.

In all the exemplary embodiments and discussions, conventional mechanical controls are considered. The present invention can be used in pointing and controls devices using any type of controls, mechanical or sensor-based. In fact, with sensor-based controls the present invention can offer further advantages. Firstly, sensor-based controls, such as sensor switch controls and sensor motion controls, do not require mechanical couplings (for example, to micro switches and actuators) but are electrically connected to the circuitry. So there would be no need for the circuit board or a portion of it to be fixed with the movable top. Secondly, sensor controls do not require gaps around them as mechanical controls do. So the present invention, with the flexible or semi-rigid sidewall, can make the housing completely sealed. Such sealed pointing and control devices can be used in unfavorable (such as high-dust, high-humidity, even underwater) environments.

These examples are not intended to be exhaustive, rather, they are intended to teach the fundamental idea of the present invention.

Conclucions, Ramifications, and Scope

The present invention deals with a major problem in using conventional pointing and control devices: stress and even permanent injury may result on the hand or arm muscles due to the incorrect posture imposed by conventional pointing and control devices.

The fundamental idea of the present invention includes two parts: (1) using an adjustable coupling means (a semi-rigid sidewall or a flexible sidewall plus an adjustable coupling assembly) to couple the top and the base of the housing, which provides adjustability in up to three desirable directions (roll, pitch, and height) and seals the housing; (2) using an automatic handedness switch to keep suitable control configuration for right-handed and left-handed users based on the roll orientation of the top of the housing. The adjustable coupling assembly comprises any suitable number of three types of independently adjustable elements, each type provides adjustability in a desirable direction, with any suitable interconnection. From the foregoing detailed description of the exemplary embodiments, it is clear that the present invention overcomes all aforementioned major problems existing in the prior-art designs and has many additional advantages.

The adjustable pointing and control device of the present invention can provide adjustments in all three desirable directions (roll, pitch, and height), as opposed to only one or two directions, as provided by the prior-art designs. In particular, the height adjustment is not only a desirable feature in and of itself, but it also provides room for ample adjustments in the other two directions. The adjustable pointing and control device of the present invention prohibits movements in any undesirable direction, such as rotation in yaw (azimuthal) direction, as allowed by prior-art designs. The adjustable pointing and control device of the present invention provides independent adjustments in each direction, as opposed to dependent or correlated adjustments provided by the prior-art designs. The adjustable pointing and control device of the present invention further provides a much larger range and continuous adjustment in each direction, as opposed to a very limited range or a few discrete positions as provided by prior-art designs. Therefore, the adjustable pointing and control device of the present invention provides an optimal operating position practically to any user at any working position, as opposed to that suitable to a particular group of users at some particular working positions, as provided by prior-art designs. The adjustable pointing and control device of the present invention can be easily shifted from one handedness to the other, with the controls automatically configured by the automatic handedness switch. No conscious effort is required of the user, as opposed to having to flip an external switch, detach, rotate, and reattach a button plate or top, or to keep constant contact with a handedness sensor, as required by prior-art designs. Even in the case of using external sensor or mechanical switches, the present invention requires neither redundant control buttons nor complex logic circuitry as required by the prior-art designs. The adjustable pointing and control device of the present invention have a closed housing, as opposed to prior-art designs where open gaps or holes are required for adjustments. Yet, the adjustable pointing and control device of the present invention requires a minimal number of ordinary and inexpensive parts, it involves only minimal modifications in the circuitry, and no modification at all in other components (motion sensor, etc.) and the software (device driver) of the existing pointing and control devices. This further improves the reliability and marketability of the adjustable pointing and control device of the present invention.

From the foregoing discussion of the fundamental concept of the present invention and the detailed descriptions of the exemplary embodiments, it is clear that the present invention can be applied to almost all types of pointing and control devices, either currently existing or foreseeable for the future. FIG. 1-A to 1-D show several exemplary applications of the present invention, in mouse, trackball, touch pad, and joystick, respectively. In these figures, for the purpose of illustration, the adjustable pointing and control devices are shown in plain and simple structures, with a basically planar top and a rectangular shape. It is obvious that the present invention can also be applied to pointing and control devices with other shapes and structures, such as an ergonomic top with any suitable number of controls. Even with a non-symmetric design that targets one handedness, the present invention can be applied partially where the roll adjustment is restricted to one side that is suitable for the targeted handedness (for example, from neutral position to right for right-handedness) and the handedness switch is omitted.

There are numerous ways of carrying out the fundamental idea and spirit of the present invention. Given the disclosure of the fundamental idea and spirit of present invention and the exemplary embodiments, many additional embodiments, ramifications, and modifications will become obvious. These additional embodiments, ramifications, and modifications are all covered by the scope of the present invention. The following claims are intended to cover the fundamental idea and the spirit of the present invention. The scope of the present invention should be determined by the appended claims and their legal equivalents, rather than by the given examples.

I claim:

1. A method for constructing an adjustable pointing and control device that controls at least one piece of equipment, comprising the steps of:
   (a) providing an adjustable housing having a lower portion, an upper portion, and an adjustable coupling means, said upper portion having a upper surface that substantially fits to a hand, said adjustable coupling means coupling to said lower portion and said upper portion, and allowing said upper portion to be adjusted relatively to said lower portion with at least one type of adjustments selected from the group consisting of rotational adjustment in roll direction, rotational adjustment in pitch direction, and translational adjustment in vertical direction, said adjustable coupling means also providing the sidewall of said adjustable housing,
   (b) providing a predetermined number of controls that are user operable and generate control signals accordingly,
   (c) providing a circuitry disposed inside said adjustable housing, said circuitry coupling to said controls and having a communication link to said equipment, said circuitry processing said control signals and sending them to said equipment via said communication link, whereby said adjustable pointing and control device can be adjusted in up to three directions, and said adjustable housing is closed to protect the inside components.

2. The method of claim 1 wherein said adjustable coupling means comprises an adjustable coupling assembly and a flexible sidewall, said adjustable coupling assembly coupling to said lower portion and said upper portion, and comprising a predetermined number of adjustable elements selected from the group consisting of roll-adjusting element that allows rotational adjustment in roll direction, pitch-adjusting element that allows rotational adjustment in pitch direction, and vertical-adjusting element that allows translational adjustment in vertical direction, said flexible sidewall being of substantially tubular shape with a first end joining said lower portion substantially along its circumference and a second end joining said upper portion substantially along its circumference, said flexible sidewall being flexible enough to accommodate the adjustments, whereby said adjustable coupling means provides adjustments in up to three directions and provides sidewall of said adjustable housing to protect the inside components.

3. The method of claim 1 wherein said adjustable coupling means comprises an adjustable coupling assembly and a flexible sidewall, said adjustable coupling assembly coupling to said lower portion and said upper portion and comprising a predetermined number of adjustable elements selected from the group consisting of roll-adjusting element that allows rotational adjustment in roll direction, pitch-adjusting element that allows rotational adjustment in pitch direction, and vertical-adjusting element that allows translational adjustment in vertical direction, a predetermined number of said adjustable elements having latching means selected from the group consisting of lockable latching means and non-lockable latching means, said lockable latching means allowing said adjustable element to be adjusted when and only when unlocked, said non-lockable latching means allowing said adjustable element to be adjusted when and only when the applied force and torque exceed predetermined thresholds, said flexible sidewall being of substantially tubular shape with a first end joining said lower portion substantially along its circumference and a second end joining said upper portion substantially along its circumference, said flexible sidewall being flexible enough to accommodate the adjustments.

4. The method of claim 1 wherein said adjustable coupling means comprises a semi-rigid sidewall of substantially tubular structure with a first end joining said lower portion substantially along its circumference and a second end joining said upper portion substantially along its circumference, said semi-rigid sidewall having appropriate property that allows said upper portion to be adjusted relatively to said lower portion with at least one type of adjustments selected from the group consisting of rotational adjustment in roll direction, rotational adjustment in pitch direction, and translational adjustment in vertical direction, said semi-rigid sidewall allowing adjustment when and only when the applied force and torque exceed predetermined thresholds, whereby said semi-rigid sidewall provides adjustment in up to three directions and makes said adjustable housing closed to protect the inside components.

5. The method of claim 1 wherein a predetermined number of said controls have a left-hand configuration that is more suitable to left-handed users and a right-hand configuration that is more suitable to right-handed users, said adjustable coupling means provides at least said rotational adjustment in roll direction and the range of the roll adjustment is divided by a predetermined boundary into a left-hand zone that is more suitable to left-handed users, and a right-hand zone that is more suitable to right-handed users, an automatic handedness switch is further provided, said automatic handedness switch mechanically coupling to at least said upper portion and electrically coupling to said circuitry and a predetermined number of said controls, said automatic handedness switch automatically configuring said controls to said right-hand configuration when the orientation of said upper portion belongs to said right-hand zone, and to said left-hand configuration when the orientation of said upper portion belongs to said left-hand zone, whereby said controls are always configured to the correct handedness without additional user action.

6. An adjustable pointing and control device that controls at least one piece of equipment, comprising:
   (a) an adjustable housing having a lower portion, an upper portion, and a semi-rigid sidewall, said upper portion having a upper surface that substantially fits to a hand, said semi-rigid sidewall being of substantially tubular structure with a first end joining said lower portion substantially along its circumference and a second end joining said upper portion substantially along its circumference, said semi-rigid sidewall having appropriate property that allows said upper portion to be adjusted relatively to said lower portion with at least one type of adjustments selected from the group consisting of rotational adjustment in roll direction, rotational adjustment in pitch direction, and translational adjustment in vertical direction, said semi-rigid sidewall allowing adjustment when and only when the applied force and torque exceed predetermined thresholds,
   (b) a predetermined number of controls that are user operable and generate control signals accordingly,
   (c) a circuitry disposed inside said adjustable housing, said circuitry coupling to said controls and having a communication link to said equipment, said circuitry processing said control signals and sending them to said equipment via said communication link, whereby said adjustable pointing and control device can be adjusted in up to three directions, and said semi-rigid sidewall makes said adjustable housing closed to protect the inside components.

7. The adjustable pointing and control device of claim 6 wherein a predetermined number of said controls have a left-hand configuration that is more suitable to left-handed users and right-hand configuration that is more suitable to right-handed users, said semi-rigid sidewall provides at least said rotational adjustment in roll direction and the range of the roll adjustment is divided by a predetermined boundary into a left-hand zone that is more suitable to left-handed users and a right-hand zone that is more suitable to right-handed users, an automatic handedness switch is further provided, said automatic handedness switch mechanically coupling to at least said upper portion and electrically coupling to said circuitry and a predetermined number of said controls, said automatic handedness switch automatically configuring said controls to said right-hand configuration when the orientation of said upper portion belongs to said right-hand zone, and to said left-hand configuration when the orientation of said upper portion belongs to said left-hand zone, whereby said controls are always configured to the correct handedness without additional user action.

8. The adjustable pointing and control device of claim 6 wherein said semi-rigid sidewall seals along the circumferences of said lower portion and said upper portion, making said adjustable housing sealed, whereby said adjustable pointing and control device can withstand hazardous environment.

9. An adjustable pointing and control device that controls a predetermined number of equipment, comprising:
 (a) an adjustable housing having a lower portion, an upper portion, and an adjustable coupling assembly, said upper portion having a upper surface that substantially fits to a hand, said adjustable coupling assembly coupling to said lower portion and said upper portion, said adjustable coupling assembly comprising a predetermined number of adjustable elements selected from the group consisting of roll-adjusting element that allows rotational adjustment in roll direction, pitch-adjusting element that allows rotational adjustment in pitch direction, and vertical-adjusting element that allows translational adjustment in vertical direction,
 (b) a predetermined number of controls that are user operable and generate control signals accordingly,
 (c) a circuitry disposed inside said adjustable housing, said circuitry coupling to said controls and having a communication link to said equipment, said circuitry processing said control signals and sending them to said equipment via said communication link,
 whereby said adjustable pointing and control device can be adjusted in up to three directions.

10. The adjustable pointing and control device of claim 9 wherein a predetermined number of said controls have a left-hand configuration that is more suitable to left-handed users and a right-hand configuration that is more suitable to right-handed users, said adjustable coupling assembly comprises at least said roll-adjusting element and the range of the roll adjustment is divided by a predetermined boundary into a left-hand zone that is more suitable to left-handed users, and a right-hand zone that is more suitable to right-handed users, an automatic handedness switch is further provided, said automatic handedness switch mechanically coupling to at least said upper portion and electrically coupling to said circuitry and a predetermined number of said controls, said automatic handedness switch automatically configuring said controls to said right-hand configuration when the orientation of said upper portion belongs to said right-hand zone, and to said left-hand configuration when the orientation of said upper portion belongs to said left-hand zone, whereby said controls are always configured to the correct handedness without additional user action.

11. The adjustable pointing and control device of claim 9, a flexible sidewall is further added, said flexible sidewall being of substantially tubular shape with a first end joining said lower portion substantially along its circumference and a second end joining said upper portion substantially along its circumference, said flexible sidewall being flexible enough to accommodate the adjustments, whereby said flexible sidewall closes said adjustable housing to protect the inside components.

12. The adjustable pointing and control device of claim 9, a flexible sidewall is further added, said flexible sidewall being of substantially tubular shape with a first end sealing said lower portion substantially along its circumference and a second end sealing said upper portion substantially along its circumference, making said adjustable housing sealed, whereby said adjustable pointing and control device can withstand hazardous environment.

13. The adjustable pointing and control device of claim 9, a predetermined number of said adjustable elements further have latching means selected from the group consisting of lockable latching means and non-lockable latching means, said lockable latching means allowing said adjustable element to be adjusted when and only when unlocked, said non-lockable latching means allowing said adjustable element to be adjusted when and only when the applied force and torque exceed predetermined thresholds.

14. The adjustable pointing and control device of claim 9 wherein said adjustable coupling assembly comprises said roll-adjusting element, whereby said upper portion can be adjusted in roll direction.

15. The adjustable pointing and control device of claim 9 wherein said adjustable coupling assembly comprises said pitch-adjusting element, whereby said upper portion can be adjusted in pitch direction.

16. The adjustable pointing and control device of claim 9 wherein said adjustable coupling assembly comprises said vertical-adjusting element, whereby said upper portion can be adjusted in vertical direction.

17. The adjustable pointing and control device of claim 9 wherein said adjustable coupling assembly comprises said roll-adjusting element and said pitch-adjusting element, whereby said upper portion can be adjusted in roll and pitch direction.

18. The adjustable pointing and control device of claim 9 wherein said adjustable coupling assembly comprises said roll-adjusting element and said vertical-adjusting element whereby said upper portion can be adjusted in roll direction and vertical direction.

19. The adjusting pointing and control device of claim 9 wherein said adjustable couping assembly comprises and pitch-adjusting element and said vertical-adjusting element whereby said upper portion can be adjusted in pitch direction and vertical direction.

20. The adjustable pointing and control device of claim 9 wherein said adjustable coupling assembly comprises said roll-adjusting element, said pitch-adjusting element, and said vertical-adjusting element, whereby said upper portion can be adjusted in roll direction, pitch direction, and vertical direction.

* * * * *